United States Patent
Martin et al.

(10) Patent No.: US 12,001,230 B2
(45) Date of Patent: Jun. 4, 2024

(54) SENSING AND CONTROL OF VEHICLE WASH COMPONENTS AND SYSTEMS AND METHODS THEREOF

(71) Applicant: Sonny's HFI Holdings, LLC, Wilmington, DE (US)

(72) Inventors: Ken Martin, Little Canada, MN (US); Bryan Flood, Minneapolis, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 36 days.

(21) Appl. No.: 17/237,487

(22) Filed: Apr. 22, 2021

(65) Prior Publication Data
US 2021/0349482 A1    Nov. 11, 2021

Related U.S. Application Data

(60) Provisional application No. 63/021,161, filed on May 7, 2020.

(51) Int. Cl.
| | |
|---|---|
| *G05D 7/06* | (2006.01) |
| *B05B 12/00* | (2018.01) |
| *B60S 3/04* | (2006.01) |
| *G05B 15/02* | (2006.01) |
| *G05B 19/042* | (2006.01) |

(52) U.S. Cl.
CPC ........... *G05D 7/0617* (2013.01); *B05B 12/00* (2013.01); *B60S 3/04* (2013.01); *G05B 15/02* (2013.01); *G05B 19/0426* (2013.01); *G05D 7/0688* (2013.01); *G05B 2219/31131* (2013.01)

(58) Field of Classification Search
CPC .... G05D 7/0617; G05D 7/0688; B05B 12/00; B05B 7/30; B05B 12/12; B05B 12/122; B05B 12/1409; G05B 15/02; G05B 2219/31131; G05B 2219/31348;
(Continued)

(56) References Cited

U.S. PATENT DOCUMENTS

| | | | |
|---|---|---|---|
| 6,360,138 B1 * | 3/2002 | Coppola | ............... G07F 7/1008 |
| | | | 700/231 |
| 6,718,216 B2 | 4/2004 | Grier | |

(Continued)

OTHER PUBLICATIONS

International Search Report and Written Opinion dated Jul. 28, 2021 in connection with PCT/US2021/028600, 13 pages.

*Primary Examiner* — Christopher W Carter
(74) *Attorney, Agent, or Firm* — Dorsey & Whitney LLP

(57) ABSTRACT

A vehicle wash component at a vehicle wash location includes a processor for controlling an operational status of the vehicle wash component, an actuator communicatively coupled to the processor and configured to operate the vehicle wash component, and a power source electrically coupled to the processor and the actuator. The processor receives a signal from a car wash controller located at the vehicle wash location, the signal for commanding control of the vehicle wash component, and upon receipt of the signal, the processor interprets the signal, generates a separate signal, and transmits the generated signal to the actuator. The actuator receives the signal from the processor for controlling the operational status of the vehicle wash component based thereon. The power source provides power to the actuator for operating the vehicle wash component based on the operational status of the vehicle wash component.

20 Claims, 4 Drawing Sheets

(58) Field of Classification Search
CPC ..... G05B 19/0426; G05B 19/056; B60S 3/04; B08B 13/00
See application file for complete search history.

(56) References Cited

U.S. PATENT DOCUMENTS

| | | |
|---|---|---|
| 7,045,021 B2 | 5/2006 | Ewing et al. |
| 8,163,096 B2 | 4/2012 | Belanger et al. |
| 8,527,372 B2 | 9/2013 | Sanville et al. |
| 9,389,114 B2 | 7/2016 | Rietsch, Jr. et al. |
| 9,421,566 B2 | 8/2016 | Harris et al. |
| 10,144,396 B1 | 12/2018 | Krause et al. |
| 2004/0220817 A1 | 11/2004 | Sanville et al. |
| 2008/0046278 A1* | 2/2008 | Sanville ................ G06Q 10/06 700/283 |
| 2009/0088874 A1 | 4/2009 | Arceo et al. |
| 2010/0186778 A1* | 7/2010 | Martin .................... B08B 3/024 134/113 |
| 2013/0103585 A1* | 4/2013 | Carapelli .............. G07F 13/025 705/44 |
| 2017/0185092 A1 | 6/2017 | Mäkinen et al. |
| 2018/0345918 A1 | 12/2018 | Foerg et al. |
| 2019/0056977 A1* | 2/2019 | Wang ................ G06F 13/4027 |
| 2020/0022322 A1 | 1/2020 | Lafian |

\* cited by examiner

SENSING AND CONTROL OF VEHICLE WASH COMPONENTS AND SYSTEMS AND METHODS THEREOF

CROSS-REFERENCE TO RELATED APPLICATIONS

This application claims priority to U.S. Provisional Patent Application No. 63/021,161, filed May 7, 2020, entitled "Sensing and Control of Vehicle Wash Components and Systems and Methods Thereof," which is incorporated by reference herein, in the entirety and for all purposes.

TECHNICAL FIELD

Autonomously configured vehicle wash components are provided in vehicle wash settings for facilitating vehicle wash operations.

BACKGROUND

Car washes are often labor, equipment maintenance, and input intensive. In addition, chemicals used in the car wash industry have become increasingly concentrated in order to reduce material handling concerns and shipping costs of those chemicals. The concentrated chemicals result in degradation of vehicle wash components, which require periodic replacement or repair.

SUMMARY

Implementations provide vehicle wash components configured for use in vehicle wash settings for facilitating fluid management (e.g., water, mixed chemical, air, and foams of mixed chemical and air) in vehicle wash operations.

According to one implementation, a vehicle wash component is configured to control fluid delivery at a vehicle wash location, and includes a processor configured to control an operational status of the vehicle wash component; an actuator communicatively coupled to the processor and configured to operate the vehicle wash component; and a power source electrically coupled to the processor and the actuator. In operation, the processor is configured to receive a signal from a car wash controller located at the vehicle wash location, the signal for commanding control of the vehicle wash component located at the vehicle wash location, and upon receipt of the signal, the processor interprets the signal, generates a separate signal, and transmits the generated signal to the actuator, the generated signal for controlling the operational status of the vehicle wash component. The actuator receives the signal from the processor, and the power source provides power to the actuator for operating the vehicle wash component based on the generated signal for the control of fluid delivery.

In various implementations and alternatives, the power source is independent of any power source of the car wash controller. In addition or alternatively, the vehicle wash component includes a fluid delivery nozzle, and the actuator includes a solenoid valve operatively coupled to the fluid delivery nozzle. The vehicle wash component may include a plurality of fluid delivery nozzles and the actuator may include a plurality of solenoid valves each operatively coupled to a respective one of the plurality of fluid delivery nozzles.

In various implementations and alternatives, the signal received from the car wash controller is a sensed voltage, and the processor may instruct the actuator to be powered at a voltage independent of the sensed voltage.

The processor may be coupled to a computer network, and a vehicle wash communications gateway in a location proximate the vehicle wash component at the vehicle wash location may be configured to communicatively couple the processor to the computer network. The gateway may be communicatively coupled to a plurality of the vehicle wash components at the vehicle wash location, and the communicative coupling of the vehicle wash communications gateway to the plurality of the vehicle wash components may be by a serial connection via successive vehicle wash components.

In various implementations and alternatives, the vehicle wash component is configured as a pump operated by the processor.

According to another implementation, a computer network includes any number of communications gateways, each located at separate vehicle wash locations and at least one vehicle wash component communicatively coupled to each communications gateway. Each of the at least one vehicle wash components includes a processor, an actuator configured to control an operational status of the vehicle wash component, and a power source electrically coupled to the processor and the actuator. In operation, the processor is configured to receive a signal from a car wash controller located at the vehicle wash location for commanding control of the vehicle wash component, and upon receipt of the signal, the processor interprets the signal, generates a separate signal, and sends the generated signal to operate the actuator. The actuator receives the signal from the processor to control the operational status of the vehicle wash component based thereon, and the power source provides power to the vehicle wash component based on the operational status of the vehicle wash component.

In various implementations and alternatives, each of the communications gateways monitors the operational status of its respective vehicle wash component and provides monitoring data to the network. In further implementations, the gateway may be configured to send a signal to the processor for commanding control of the vehicle wash component, and upon receipt of the signal, the processor interprets the signal, generates a separate signal, and sends the generated signal to operate the actuator. The actuator of the vehicle wash components may not receive signals directly from the car wash controller.

In various implementations and alternatives, the signal sent by the car wash controller is a sensed voltage at the processor, and the processor instructs the vehicle wash component to be powered at a voltage independent of the sensed voltage such that vehicle wash component is free of a voltage converter at a car wash controller interface of the vehicle wash component. In addition or alternatively, the power source is independent of any power source of the car wash controller.

In yet another implementation, a computer network includes a plurality of communications gateways, each of the communications gateways located at separate vehicle wash locations along with at least one vehicle wash component communicatively coupled to each communications gateway and located at a respective separate vehicle wash location. Each vehicle wash component includes a processor, and an actuator configured to control an operational status of the at least one vehicle wash component. In operation, each communications gateway is configured to send a signal to the processor for commanding control of the at least one vehicle wash component at the respective vehicle wash location, and upon receipt of the signal, the processor interprets the signal, generates a separate signal, and sends the generated signal to operate the actuator. The actuator receives the signal from the processor to control the operational status of the vehicle wash component based thereon. In addition, the actuator of the vehicle wash components may not receive signals directly from the car wash controller. In addition or alternatively, the signal sent by the car wash controller may be a sensed voltage by the processor, and the processor may instruct the vehicle wash component to be powered at a voltage independent of the sensed voltage. In addition or alternatively, the vehicle wash component additionally includes a power source that is independent of any power source of a car wash controller located at the vehicle wash location.

DETAILED DESCRIPTION

Vehicle wash components configured to control and monitor vehicle wash operations are provided, along with vehicle wash systems that include these vehicle wash components, as well as computer networks communicatively coupled thereto.

The term "vehicle wash location" encompasses a car wash and other related vehicle wash locations that are used by consumers and companies to clean motorized vehicles such as cars and trucks. The terms "vehicle wash" and "car wash" may be used interchangeably.

Figure 1A:
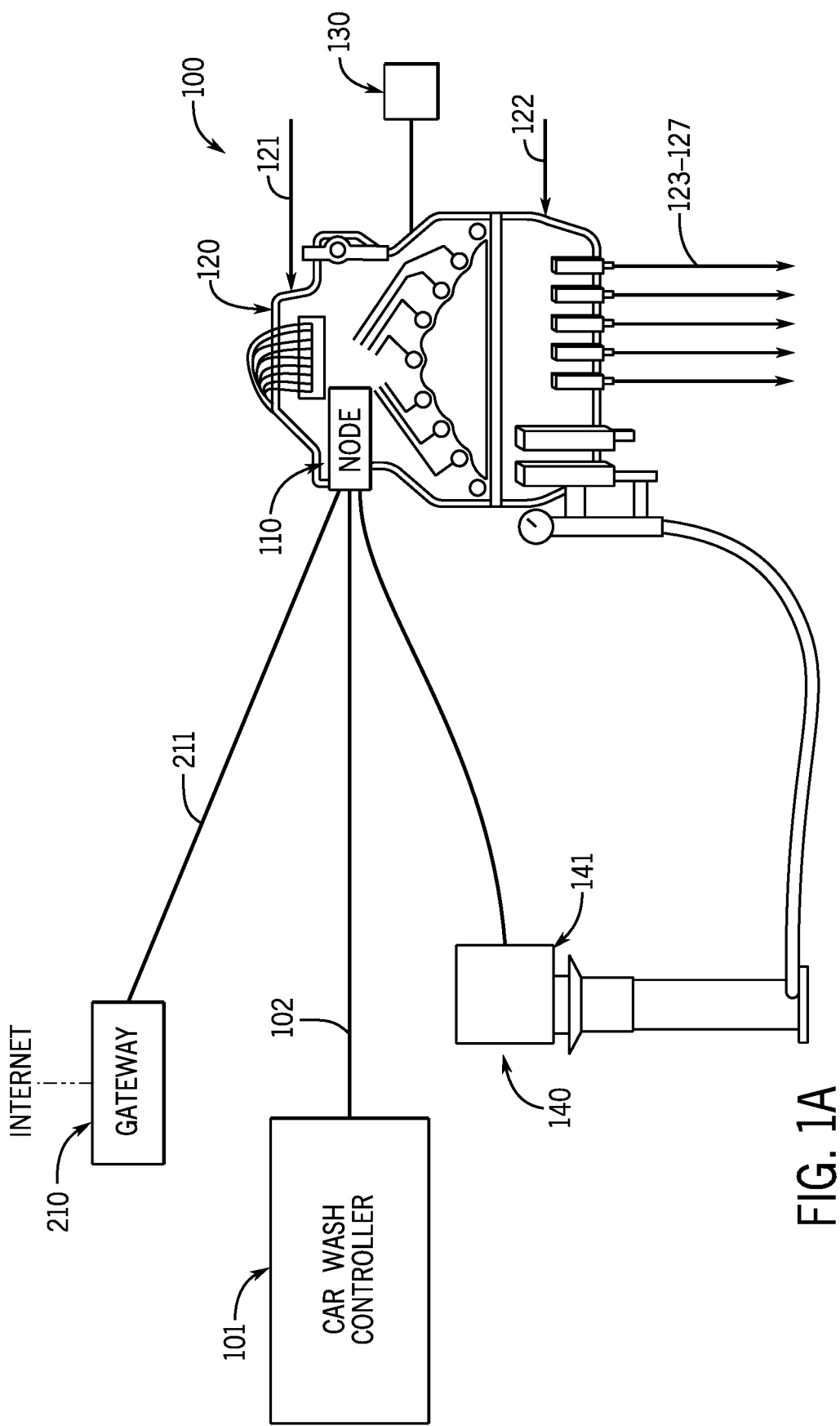
FIG. 1A illustrates a schematic diagram of a vehicle wash component according to implementations of the present disclosure.

Turning to FIG. 1A, illustrated is a vehicle wash component 100 configured to control and monitor vehicle wash operations (e.g., fluid delivery) for use in a vehicle wash system according to the present disclosure. The vehicle wash component 100 includes a processor 110, a mechanical and/or electrical component 120, and a power source 130. The vehicle wash component 100 may optionally include a pump 140. Each of these may be housed within a vehicle wash location. As illustrated in FIG. 1A, the vehicle wash component 100 may include the processor 110 and electrical components 120 integrated into a single assembly, and may include inputs for connector 102 (described herein), the power source 130, and connection 211 (described herein).

The vehicle wash component 100 may be configured to facilitate car wash operations by receiving signals from a customary car wash controller 101 located at the same vehicle wash setting as the vehicle wash component 100, and in response to receiving the signals, the processor 110 of the vehicle wash component 100 may interpret the signals and instruct the vehicle wash component 100 to operate. Rather than the customary car wash controller 101 delivering operation signals and power directly to the vehicle wash component 100, the vehicle wash component 100 is operated via the processor 110 and the power source 130 of the vehicle wash component 100, both of which are separate from the car wash controller 101 and any related components, e.g., separate from power and memory of the car wash controller 101. This enables the processor 110 to control when and if the vehicle wash component 100 will operate upon receiving the signals from the car wash controller 101.

As an example, the customary car wash controller 101 is a power source that delivers timed voltage signals to vehicle wash components, and typically delivers common control voltages of: 24 VAC, 24 VDC, or 120 VAC, ±20%. However, the processor 110 of the vehicle wash component 100 interprets the control voltage simply as a signal (e.g., a sensed voltage), and instead of allowing the same signal to be relayed to the mechanical and/or electrical component 120 of the vehicle wash component 100, the processor 110 interprets the signal (e.g., as a signal meant to perform some action or operation by the vehicle wash component 100), generates a different control signal and sends this to the mechanical and/or electrical component 120 for operating the vehicle wash component 100. Thus, while the car wash controller 101 controls the operation of other car wash devices in the vehicle wash setting, the car wash controller 101 more simply delivers a signal to the vehicle wash component 100 for subsequent interpretation by the processor 110 and action. This configuration provides the vehicle wash component 100 autonomy relative to other devices within the car wash that are controlled in a customary manner by the car wash controller 101. More particularly, the customary car wash controller 101 is responsible not only for initiating proper air, water, and chemical dispensing, but also for coordinating other aspects of the car wash including the position of the vehicle relative to the dispensing and cleaning apparatus. It does this by using programmable logic controller (PLC) or similar technology to send signals to various car wash equipment. These signals might be control voltages, analog signals, or digital signals. While the car wash controller 101 can control a variety of different vehicle wash components, the vehicle wash components 100 of the present disclosure are responsible for orchestrating their own operation due to their ability to interpret control signals received from the car wash controller 101 and generate new control signals for operation of the vehicle wash component. In a vehicle wash location, a number of wash components may be controlled by the car wash controller 101, while vehicle wash components (e.g., 100, 100', 100") provided according to the present disclosure, operate independently from the car wash controller's 101 commands.

The processor 110 of the vehicle wash component 100 uses onboard memory and programming for control the vehicle wash component 100. The processor 110 may be communicatively coupled to the mechanical and/or electrical component 120, the power source 130, the pump 140, the car wash controller 101, as well as other system and network components of the present disclosure; and may be configured to send and receive signals to and from these communicatively coupled components. The microprocessor 110 may be configured, for instance, as a microcontroller or a computer processor depending processing requirements for operating the vehicle wash component 100. The processor 110 generates control signals to, for instance, cause the power source 130 to power on/off the vehicle wash component 100 via the coupling between the mechanical and/or electrical component 120 and the power source 130. Accordingly, the processor 110 may instruct the vehicle wash component 100 to be powered at a voltage independent of the sensed voltage from the car wash controller 101 such that vehicle wash component 110 is not capable of converting voltage received from the car wash controller 101 into a different voltage for operation of the electrical component 120. However, the vehicle wash component 100 may include a voltage converter that takes a standard input (e.g., 24 VDC) for valve actuation and converts to a different voltage (e.g., 5 VDC) for the processor 110, but such a converter is not present at an interface between the vehicle wash component 100 and the car wash controller 101.

Further, because the processor 110 is programmed to generate a separate signal from the car wash controller 101, the vehicle wash component 100 may be operated using different operating parameters relative to the parameters sent by the car wash controller 101. The processor 110 may be configured to receive control signals from the car wash controller 101 and/or from the communications gateway 210, and/or from other processors 110 of other vehicle wash components described herein, and based on a variety of information collected by the processor 110, the processor may generate a new control signal and send to the mechanical and/or electrical component 120 of its vehicle wash component 100 in a dedicated manner. For instance, the processor 110 may be programmed to track operations of the car wash component 100 and generate control signals for operation of the car wash component 100 based thereon. The processor 110 may query its communicatively coupled components for information that can affect the operating parameters of the vehicle wash component 100 and may be used by the processor 110 to configure the control signal using the received information. In some implementations, the processor 110 may be configured to only receive commands from the car wash controller 101 and/or the communications gateway 210, and/or from other processors of other vehicle wash components, but may not be configured to send instructions to these components.

Thus, in certain implementations, the processor 110 may receive signals from the vehicle wash component 100 itself, e.g., indicating an operational status the mechanical and/or electrical component 120, as well as signals and information from other communicatively coupled components such as other vehicle wash components (e.g., 100'), actuators, motors, variable frequency drives, pumps and valves, sensors, a communications gateway in the vehicle wash setting, and from network components outside of the vehicle wash setting, for use in generating the separate signal for controlling the mechanical and/or electrical component 120. For instance, the processor 110 may be programmed to sense or receive information about power to the overall system, power to the vehicle wash component 100, connectivity to a network, the number of operations of the vehicle wash component 100 (e.g., dispensing events, timing of dispensing events), chemical supply levels, dilution level, chemical conductivity, pH of a mixed solution, pH of a chemical, pH of water, temperature of the vehicle, ambient temperature, humidity of the vehicle wash location, soil level on a vehicle, soil type, the location of the vehicle wash component (e.g., GPS components or arrangement within the vehicle wash), age, wear, or operational status, and a network identifier.

In one example, the number of cycles or duration a vehicle wash component 100 has been in use may be determined by the processor 110 and may provide reporting to the network components based thereon. The processor 110 may be programmed to generate different control signals for operating the vehicle wash component 100 using the gathered information. The processor 110 may instruct motors or pumps to be powered on for a longer duration as the vehicle wash component 100 ages in order to reduce wear on the component from frequent on/off cycles. Other examples may involve the processor 110 generating control signals to adjust pump pressure, chemical use, dilution ratios, and so on.

The processor 110 may be powered via a communication link, such as a link from network components at the vehicle wash location. For instance, the processor 110 may be coupled via a serial communication cable to a network component and may be powered therefrom. In addition or alternatively, the processor 110 may be powered from another power source, for instance, depending upon the need for connection of sensors or actuators and their power demand. In some implementations, the processor 110 is powered from the power source 130.

The mechanical and/or electrical component 120 of the vehicle wash component 100 is configured to facilitate car wash operations, such as the control of fluid delivery, in response to receiving control signals from the processor 110. The mechanical and/or electrical component 120 may be an actuator and may include one or more valves, and the processor 110 may be referred to as a valve node. The valve(s) may be coupled to one or more nozzles configured to mix chemical and water in a mixed solution of diluted chemical and distribute the mixed solution. For instance, the vehicle wash component 100 may include one or more solenoid valves, each operatively connected to a fluid delivery nozzle, and controlling an on/off status of the solenoid valve(s) may be used to control fluid flow through the fluid delivery nozzle(s). In FIG. 1A, a motive fluid inlet 121 and one or more chemical inlets 122 may deliver motive fluid and chemical, respectively, to the vehicle wash component 100 upon operation of the mechanical and/or electrical component 120 to cause mixed fluid to exit one or more mixed chemical outlets 123-127. Accordingly, the mechanical and/or electrical component 120 may be configured as a bank of valves, known as a dispensing panel, responsible for distributing mixed chemicals from a plurality of nozzles coupled to the bank of valves in response to receiving control signals from the processor 110 of the vehicle wash component 100. Chemical delivery systems that include actuators and venturi valves are disclosed in U.S. Pat. No. 8,887,743 B2, the disclosure of which is incorporated herein by reference for any useful purpose. In another example, a dilution device may be coupled to the mechanical and/or electrical component 120, and dilution devices are disclosed in US 2019/0022607 A1, the disclosure of which is incorporated herein by reference for any useful purpose. Other configurations of the mechanical and/or electrical component 120 include but are not limited to: pumps, motors (e.g., stepper motors), sensors (e.g., thermometers, cameras), heating elements, servo actuators, or another actuator that requires electric control. In such configurations, the mechanical and/or electrical component 120 may be configured for controlling distribution of fluids (e.g., air, water, mixed chemical, foam) via an on/off status.

In some implementations, the mechanical and/or electrical component 120 may operate by a single control voltage, which may be 24 VDC, provided by the power source 130. However, the mechanical and/or electrical component 120 may be configured to accept any common control voltage, e.g., 24 VAC, 24 VDC, or 120 VAC, ±20%, and so on, from the power source 130. According to implementations of the present disclosure, the processor 110 receives a sensed voltage from the car wash controller 101, and the processor 110 instructs the mechanical and/or electrical component 120 of the vehicle wash component 100 to be powered via the power source 130 at a voltage independent of the sensed voltage. Accordingly, the power source 130 may be configured to operate the mechanical and/or electrical component 120 in response to receiving control signals from the processor 110. The power source 130 may be integrated into the vehicle wash component 100 or may be arranged separately within the confines of the vehicle wash location and may be configured as a breaker box, for example. The power source 130 is independent of any power source of the car wash controller 101, which provides autonomy to the vehicle wash component 100.

An optional pump 140 of the vehicle wash component 100 provides fluid pressure to the vehicle wash component 100. The pump 140 may be communicatively coupled to the processor 110 and the power source 130 and be configured to deliver the fluid pressure to operate the mechanical and/or electrical component 120. For instance, upon receipt of power from the power source 130 in response control signals from the processor 110, the pump 140 may deliver fluid pressure over a pre-determined timing cycle to a fluid input line of the mechanical and/or electrical component 120. The pump 140 provides water pressure to the vehicle wash component 100, which may provide pressure assistance to a water supply, e.g., a municipal water supply, or may provide the sole source of pressure to the water input of the vehicle wash component 100. The pump 140 may also provide pressure to a chemical input of the vehicle wash component 100, however, the chemical input may alternatively rely on vacuum pressure for fluid delivery into the vehicle wash component 100, for instance using venturi valves, which are disclosed in U.S. Pat. No. 8,887,743 B2. The pump 140 may include a processor 141 communicatively coupled to the processor 110 of the vehicle wash component 100 and operation of the pump 140 may be controlled through communications between the processors 110, 141. As can be appreciated, in some implementations, the pump 140 may be a vehicle wash component 100 that cooperates with other vehicle wash components, e.g., a second vehicle wash component 100', as described.

In some implementations, the processor 110, the mechanical and/or electrical component 120, the power source 130, and/or the pump 140 may be housed within the vehicle wash component 100, and may be integrated into the same dispensing panel. In a further example, the processor 110 may be wired or wirelessly coupled to the vehicle wash component 100. For instance, the processor 110 may be wired to multiple, individual actuators, all of which are housed within a dispensing panel.

Figure 1B:
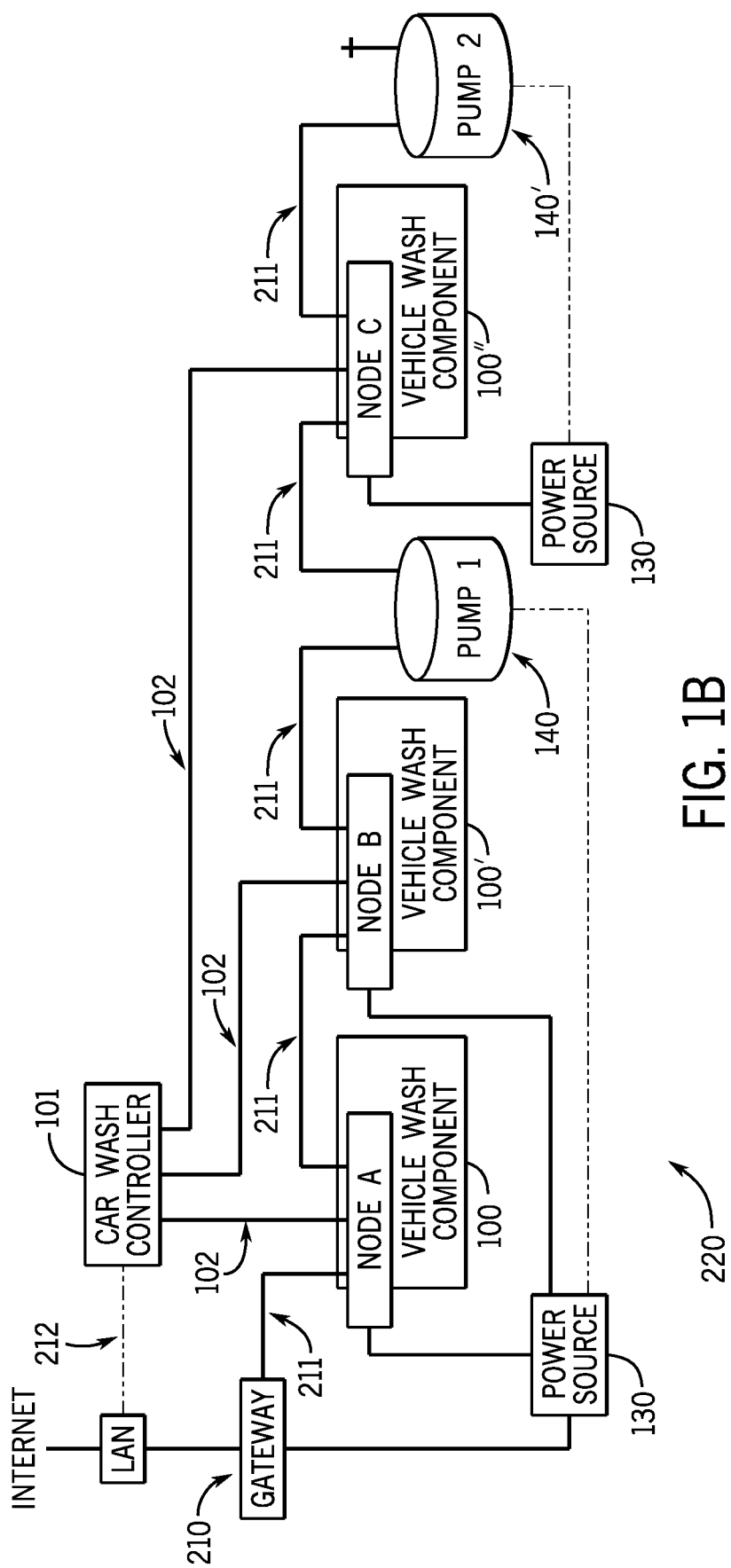
FIG. 1B illustrates a schematic diagram of vehicle wash components communicatively coupled to one another in a vehicle wash setting according to implementations of the present disclosure.

Turning to FIG. 1B, multiple vehicle wash components 100, 100', 100" may be communicatively coupled to a local communications gateway 210 for use in facilitating vehicle wash operations in the car wash setting 220 according to implementations of the present disclosure. The multiple vehicle wash components 100, 100', 100" may be configured as solenoid valves, pumps, motors, sensors, heating elements, servo actuators, other actuators, and so on, and each includes the components of the vehicle wash component 100, as described. As shown in FIG. 1B, the power source 130 may provide power to the multiple vehicle wash components and the gateway 210, optionally pumps 140; however, the power source 130 is separate from any power source derived from the car wash controller 101 to allow for the independent operation of the vehicle wash components.

The communications gateway 210 may be configured with a processor and coupled to the vehicle wash components 100, 100', 100" via connection 211 (e.g., a serial connection) and the car wash controller 101 via connection 212. Each vehicle wash location 220 may include its own communications gateway 210 and the gateway 210 may be coupled to remote locations via the internet, as well as to other devices at the vehicle wash location 220 via the internet via a local area network (LAN) or other near range communication equivalents, e.g., Wi-Fi, Bluetooth or LoRa, RFID, NFC, ANT, Zigbee, or WLAN, or via long range communication equivalents such as WAN. The communications gateway 210 may troubleshoot or fix problems with the vehicle wash components 100, 100', 100" and may send programming updates to the vehicle wash components, for example.

Where multiple vehicle wash components (e.g., 100, 100', 100") are used in one car wash setting 220, the vehicle wash components may operate independently of one another. In addition or alternatively, a first vehicle wash component 100 may receive information about the vehicle wash component 100 itself, e.g., an occlusion such as a plugged nozzle, and sends this information to the gateway 210 for taking action. For instance, the gateway 210 may instruct a second vehicle wash component 100' to deliver mixed chemical therefrom so as to compensate for the occlusion at the vehicle wash component 100. In addition, the processor 110 of the first vehicle wash component 100 may send information to the communications gateway 210 indicating that the first vehicle wash component 100 requires maintenance or service. In addition or alternatively, the vehicle wash components (e.g., 100, 100', 100") may communicate directly with each other for assisting or controlling operation of their respective electrical components 120. In this example, the respective processors 110 may be configured to communicate with one another, for instance using the disclosed near range communication technologies, and one or more of the processors may send control signals to the other vehicle wash component for subsequent interpretation and generation of a control signal as described herein.

Some vehicle wash components may be responsible for sensing conditions that can affect preferred vehicle wash operations (e.g., water usage, chemical usage, water temperature), while other vehicle wash components may use the sensed information to dynamically adjust the operation of the vehicle wash component (e.g., to decrease water, increase chemical, deliver cold water) or to determine whether the vehicle wash component operates at all. Accordingly, examples of communicative coupling between the communications gateway 210 and vehicle wash components 100, 100', 100" include providing sensed information such as temperature, humidity, pH level, chemical supply level, dilution level, or soil level, soil type, age, wear, or operational status, from one vehicle wash component to the gateway 210. The gateway 210 may interpret the information, and generate control signals for the vehicle wash component from which the information was received, or for other vehicle wash components. For instance, the processor 110 of the second vehicle wash component 100' may receive adjusted operating parameters of the mechanical and/or electrical component 120 of the second vehicle wash component 100' based on the information received by the gateway 210 from first vehicle wash component 100. In addition or alternatively, the communications gateway 210 may serve as a communications relay between the vehicle wash components without interpreting the information, and the processor 100 of the receiving vehicle wash component may interpret the received information and generate a control signal accordingly.

In another example, hot car temperatures and alkaline chemicals applied at the beginning of a vehicle wash process can cause hazing of the clear coat on dark paint colors. Vehicle washes located in hot climates commonly perform an extra step of cooling the car with water before the alkaline chemical is applied. In such an example, a first vehicle wash component 100 configured as a temperature sensor may sense the temperature of the car and provide this information to the gateway 210 and/or to the processor 110 of a second vehicle wash component 100', which enables the second vehicle wash component 100' to deliver a control signal for whether or not to spray cold water on the car prior to the alkaline soak, which may optionally be after the gateway 210 interprets the information. If the temperature is below a certain threshold, for example, the gateway 210 and/or the processor 110 may determine that the cooling step is unnecessary and the second vehicle wash component 100' may not operate upon receipt of a control signal from the car wash controller 101, thereby conserving water. The sensing of the vehicle temperature may be performed by the first vehicle wash component 100 for each vehicle entering the vehicle wash location, thereby enabling the vehicle wash sequence to be tailored for each vehicle. The sensing may be based on locally sensed environmental data, visual data such as from thermal imaging, or by means of weather observations obtained by processor 210 over the internet.

In another example, road soil can affect the preferred vehicle wash operation. In transient communities where cars are from various locations, the cars can bring road soil from different locations. Vehicle washes are most often configured to remove road soils that are locally generated, and road soils from different geographic locations can require different chemical and mechanical approaches to remove. Using a first vehicle wash component 100 configured to sense soil type on a vehicle can enable the gateway 210 and/or processor 110 of a vehicle wash component (e.g., 100, 100', 100") to interpret the sensed information and send control signals to a third vehicle wash component 100" to cause the vehicle wash component 100" to generate a signal for controlling vehicle wash parameters, such as selecting specific pump sources and/or nozzles that deliver mixed chemicals tailored for washing the sensed soil type. More specifically, the vehicle wash component 100" may be coupled to two pumps 140, 140', and depending on the nozzles to be used, the pumps 140, 140' may be coupled different nozzles and may be selectively operated in connection with operation of vehicle wash component 100".

In yet another example, information stored at the communications gateway 210 from the vehicle wash components 100, 100' may be used to track and analyze vehicle wash performance. The gateway 210 and/or the vehicle wash components 100, 100' may be configured to determine an amount of chemical used, and this information may be aggregated at the communications gateway 210 and used for tracking sales and utilization. Profitability, for instance, may be determined on a cost-per-car basis using such information. Chemical use may also be tracked for determining when chemical supplies require reordering.

In yet still another example, a first vehicle wash component 100 configured as a pump may provide information about the pump's usage status (e.g., wear) to the second vehicle wash component 100', e.g., via near range communications or via the gateway 210, so that the processor 110 of the second vehicle wash component 100' can adjust a control signal sent to the mechanical and/or electrical component 120 of the second vehicle wash component 100' and/or to the pump, so as to extend a duration of the pump's cycle time to increase the longevity of the pump.

In additional or alternative implementations, the communications gateway 210 is configured to send a signal to the processor 110 for commanding control of the vehicle wash component 100, and similar to the processor's response to receiving a control signal from a car wash controller 101, upon receipt of the signal from the communications gateway 210, the processor 110 interprets the signal, generates a separate signal, and sends the generated signal to operate the mechanical and/or electrical component 120. For instance, the car wash controller 101 may issue commands to the communications gateway 210 over the local network components, and the communications gateway 210 may send a command signal to the processor 110. Accordingly, the mechanical and/or electrical component 120 does not receive signals directly from any component other than the processor 110, which enables the vehicle wash component 100 to operate autonomously due, in part, to the processor 110 generating a separate control signal for operating the mechanical and/or electrical component 120. This eliminates the need for a voltage converter for purposes of accommodating the voltage signal from the car wash controller 101, and configuring the vehicle wash component 100 to the specific power requirements of the car wash controller is unnecessary.

In FIG. 1B, the car wash controller 101 is coupled to the first vehicle wash component 100 as well as second and third vehicle wash components 100', 100", each via connection 102, which is a multi-conductor cable often called a "home run cable". The vehicle wash components 100, 100' and 100" are each coupled to the communications gateway 210 via a serial connection 211, such as a MODBUS RTU serial connection. The communications gateway 210 may be directly coupled to the car wash controller 101 via coupling 212, such as local area network (LAN) connection. The vehicle wash components may operate independently of one another as described herein, and optionally may operate in concert with one another, for example, by way of the communications gateway 210 and the serial connection 211. For instance, the second vehicle wash component 100' may act in concert with other vehicle wash components upon receipt of a control signal from the car wash controller 101, which may cause the second vehicle wash component 100' to query the gateway 210 for data from the first vehicle wash component 100 to perform an action or deliver information to the second vehicle wash component 100' to facilitate its operation. In addition or alternatively, prior to generating the separate signal, the processor 110 of the second vehicle wash component 100' queries other communicatively coupled devices at the vehicle wash location 220 and generates the separate signal using one or more of the responses received from the devices, such as the car wash controller 101, the communications gateway 210, another device at the vehicle wash location, or a database coupled to the network 200, for example. In some implementations, the vehicle wash components 100, 100', 100" may be communicatively coupled via peer-to-peer connections such as near range communications including Wi-Fi, Bluetooth or LoRa, RFID, NFC, ANT, Zigbee, or WLAN or via long range communication equivalents such as WAN.

Figure 2:
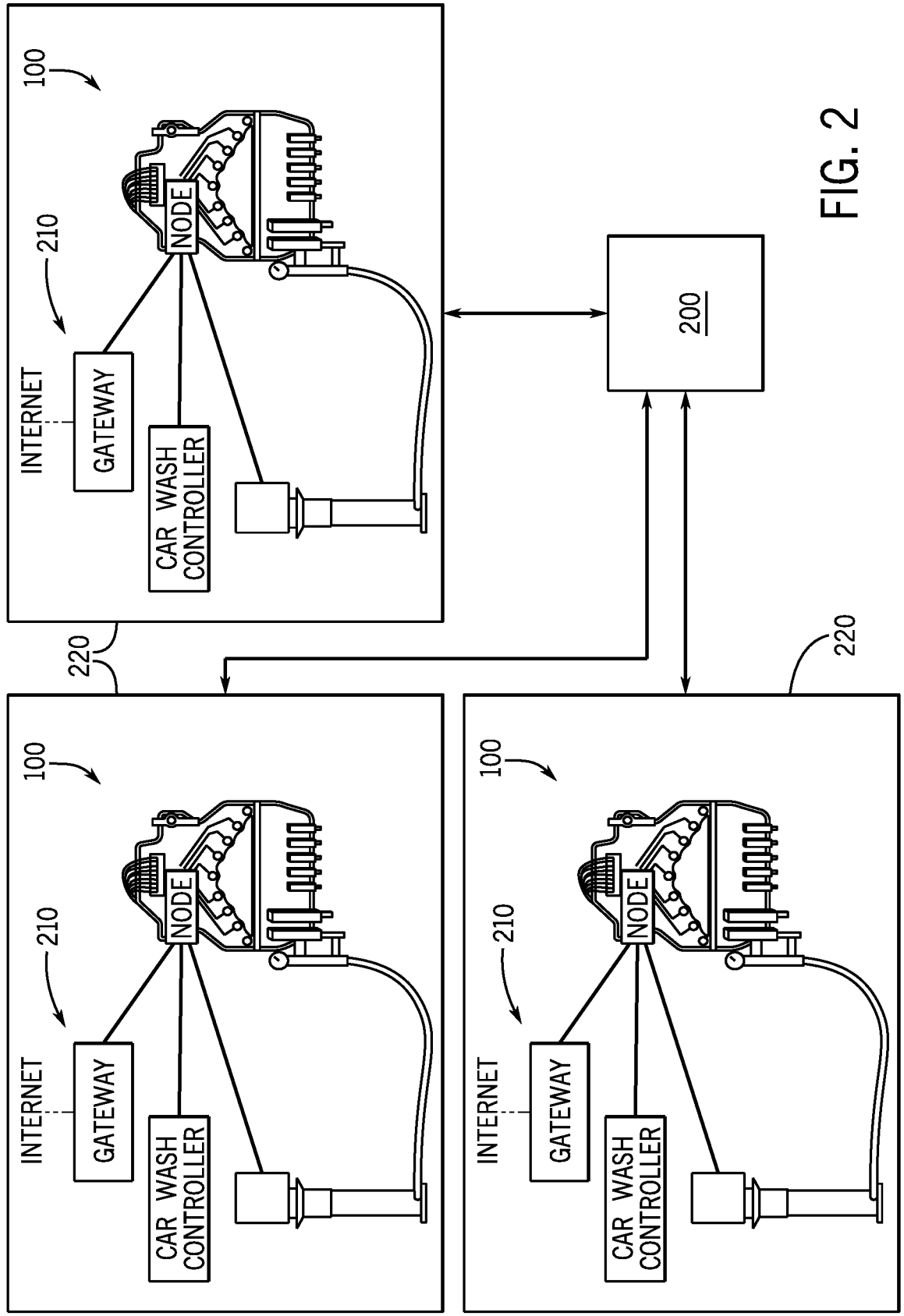
FIG. 2 illustrates schematic diagram of a computer network in which the vehicle wash component is integrated, according to implementations of the present disclosure.

FIG. 2 illustrates a computer network 200 in which the vehicle wash component 100 is integrated according to implementations of the present disclosure. In such implementations, the processor 110 of each vehicle wash component 100 may be coupled to the computer network 200 by way of the communications gateway 210 arranged at the vehicle wash location 220. The communications gateway 210 may be communicatively coupled to a plurality of the vehicle wash components 100 at the vehicle wash location 220, which enables the communications gateway 200 to receive monitoring information from each of the vehicle wash components 100. The processor 110 provides information to its respective communications gateway 210 such as information about signals received from the car wash controller 101, about the signals generated by the processor 110 and sent to the mechanical and/or electrical component 120, about the performance of the mechanical and/or electrical component 120, about the status of the power source 130, about the connectivity to the pump 140, and so on. In this way, each communications gateway 210 monitors the operational status of the vehicle wash components 100 and provides monitoring data to the network 200.

The communications gateway 210 may be connected to the network 200 over the internet, and may be connected to the vehicle wash components 100 via wired or wireless connection. Local network connections between the vehicle wash components 100 and the communications gateway 210 may include but are not limited to serial connection such as RS485 connections, Ethernet/LAN, Wi-Fi, Bluetooth, mobile data connections, and expandable connections.

In some implementations, the network 200 may transmit information to a user interface related to connectivity, usage, diagnostics, and so on for the vehicle wash components 100 at the various vehicle wash locations 220. The user interface may be delivered through a web application. The user interface may be graphically configured to include information about each of the vehicle wash components 100 at a given vehicle wash location 220, along with operating parameters such as: chemical name, injector used, alert settings, sensor connectivity, etc., of the vehicle wash component. The graphical interface may enable the user to set alerts and configure parameters.

In some implementations, a user may transmit information to the network 200 via the user interface, and for instance, may make product orders or request service calls for addressing problems at the various vehicle wash locations 220. Due to the ability of the communications gateway 210 to provide information about individual vehicle wash components 100, each having their own unique ID, product orders may identify a specific vehicle wash component 100 where the order is to be delivered and used.

The network 200 may receive periodic updates from the communications gateway 210, such as weekly, and the network 200 may be configured to aggregate this information for reporting. Critical conditions such as inventory levels and key maintenance events may be sent more frequently to the network 200. In addition or alternatively, the network 200 and/or the communications gateway 210 may be communicatively coupled to bar code readers, automatic inventory reconciliation, in bay applicators, custom chemical containers, maintenance logs and so on. The network 200 may use collected information for reporting, advanced analytics and predictive statistics (e.g., based on environmental factors).

The network 200, communications gateway 210, and/or the vehicle wash component 100 may optionally be communicatively coupled to the car wash controller 101 such that these components deliver information to the car wash controller 101, as opposed to simply receiving sensed signals, e.g., sensed voltage signals, from the car wash controller 101 at the processor 110 of the vehicle wash component 100. For instance, the car wash controller 101 may receive information related to the operational status of the vehicle wash component 100 coupled thereto. In addition or alternatively, the car wash controller 101 may be monitored and information may be collected for subsequent analysis at the network 200.

As provided, the vehicle wash component 100 operates autonomously from the car wash controller 101 and control signals from the vehicle wash controller 101 are limited in use by the processor of the vehicle wash component 100 as an indication that the processor is to generate its own control signals. In addition, the vehicle wash component 100 may receive operation signals from the communications gateway 210 or the network 200, for subsequent interpretation and separate signal generation. Consequently, in legacy settings where the vehicle wash controller 101 is being phased out, the vehicle wash component 100 may continue to be used and receive input from the communications gateway 210, the network 200, or other devices communicatively coupled to the vehicle wash component 100, the communications gateway 210, or the network 200, for example.

In some implementations, components, such as the optional pump 140 for delivering fluid to the vehicle wash component 100 may be communicatively coupled to the communications gateway 210, but not to the processor 110 of the vehicle wash component 100. In this example, a processor 141 of the pump 140 may be communicatively coupled to the communications gateway 210 and receive operating commands from the gateway 210. In some implementations, the processor 141 may be configured the same as the processor 110, and may interpret command signals and generate its own signals for controlling operation of the pump 140.

In further implementations, all vehicle wash components located at a given vehicle wash location 220 may be communicatively coupled with the communications gateway 210, but the respective processors (e.g., processor 110, or processor 141) may not be communicatively coupled with each other. This example may be similar to a MODBUS communication protocol, and the communications gateway 210 may the master, and the processors may be the slaves or client.

Figure 3:
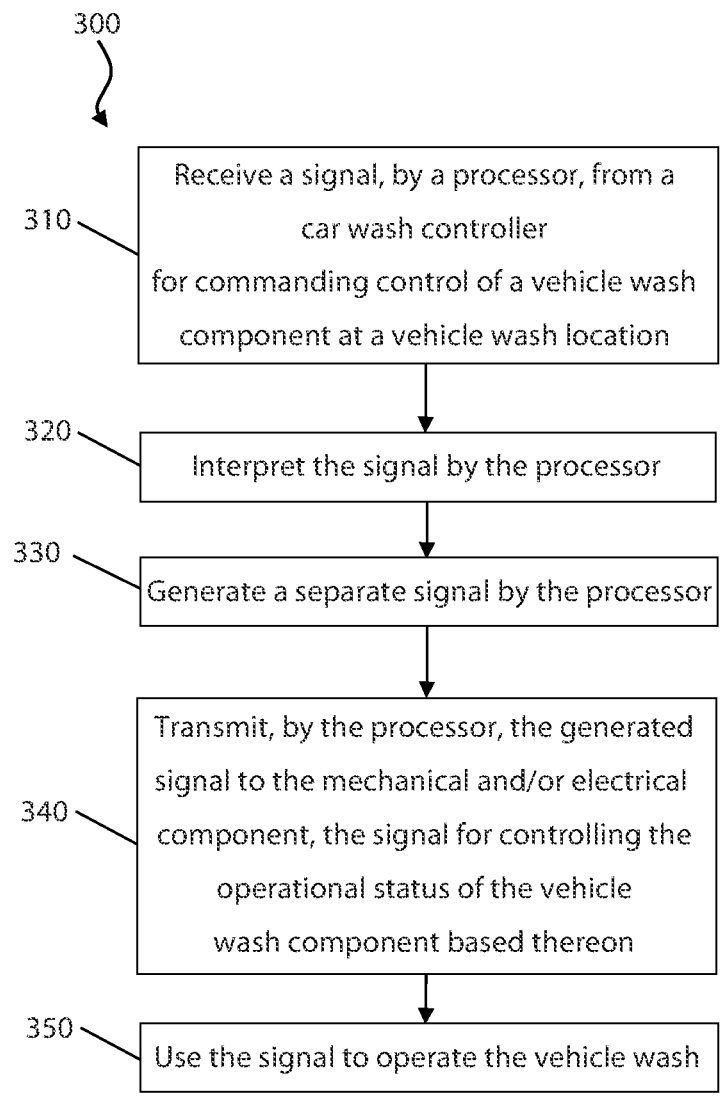
FIG. 3 is a flowchart of a method of using the vehicle wash component according to implementations of the present disclosure.

FIG. 3 is a flow diagram of a method 300 of using the vehicle wash component 100 according to the present disclosure. The method begins by the processor 110 receiving a signal from a car wash controller 101 for commanding control of a vehicle wash component 100 at a vehicle wash location 220 (operation 310). The processor 110 interprets the signal (operation 320). Based thereon, the processor 110 generates a separate signal (operation 330). In some implementations, prior to generating the separate signal in operation 330, the processor 110 queries other communicatively coupled devices at the vehicle wash location 220 and generates the separate signal using one or more of the responses received from the devices (e.g., a second vehicle wash component 100', the car wash controller 101, the communications gateway 210, another device at the vehicle wash location, or a database coupled to the network 200). The processor 110 transmits the generated signal to the mechanical and/or electrical component 120 for controlling the operational status of the vehicle wash component 100 based thereon (operation 340). Consequently, the mechanical and/or electrical component 120 does not receive signals directly from the car wash controller 101. Rather, the processor 110 blocks car wash controller signals from reaching the mechanical and/or electrical component 120; and instead, the processor-generated signal is used to operate the vehicle wash component 100 (operation 350).

In some implementations, interpretation of the signal in operation 320 and generating the separate signal 330 may involve execution of code, such as the following exemplary code:

```
for (i = 0; i < cwc_valve_inputs.count( ); ++i) {
    this_valve_input = get_cwc_valve_input(i)
    this_valve_output = get_real_valve_output(i)
    state_changed = this_valve_input.is_on ^ this_valve_output.is_energized
    if (state_changed) {
        // Has the minimum allowable time passed before state can be changed?
            if ( this_valve_output.last_changed + MIN_VALVE_CHANGE_TIME_SECS < System.now( ) ) {
            this_valve_output.energize( this_valve_input.is_on )
            // if the valve is being turned off, store precisely how long the valve was on
            if ( !this_valve_input.is_on ) {
                valve_active_milliseconds(i, System.now( ) – this_valve_output.last_changed)
            }
            this_valve_output.last_changed = System.now( )
        }
    }
}.
```

The processor 110 may, for instance, execute substantially similar code to determine whether a valve should be actuated based on the car wash controller signal, and if so, whether a minimum amount of time has passed from the prior operation of the valve, and further tracking how long the valve has been energized. If the minimum time has not passed, the processor 110 may delay sending a signal to actuate the valve until after the minimum time has passed. The programming can facilitate the independent operation of the vehicle wash component 100 and can help protect the component from being repeatedly activated in a short period of time, which can otherwise shorten the lifespan of the valve, and further, tracking the time the valve has been in use, e.g., energized, can facilitate scheduled maintenance of the vehicle wash component 100 before the valve becomes inoperable or unreliable. Similar operations may be performed by the processor 110, such as determining that the valve should not be actuated after receipt of the signal from the car wash controller 101 to operate the vehicle wash component 100, for instance, when a temperature sensor communicatively coupled to the vehicle wash component 100 senses a temperature that falls below a threshold when the valve operates to deliver a cooling rinse to the vehicle. Other operations will be appreciated by those skilled in the art, and for instance, the processor may be programmed to calculate the amount of fluid and chemical delivered through a valve-actuated nozzle.

Method 300 may be modified using various approaches as will be appreciated by those skilled in the art, and for instance, the signal may be received by the processor 110 from the communications gateway 210 in operation 310. Other modifications to method 300 will be apparent from the present disclosure.

Various changes may be made in the form, construction and arrangement of the components of the present disclosure without departing from the disclosed subject matter or without sacrificing all of its material advantages. The form described is merely explanatory, and it is the intention of the following claims to encompass and include such changes. Moreover, while the present disclosure has been described with reference to various embodiments, it will be understood that these embodiments are illustrative and that the scope of the disclosure is not limited to them. Many variations, modifications, additions, and improvements are possible. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A plurality of vehicle wash components configured to control fluid delivery at a vehicle wash location, each of the plurality of vehicle wash components comprising:
   a processor configured to control an operational status of the vehicle wash component;
   an actuator communicatively coupled to the processor and configured to operate the vehicle wash component; and
   a power source electrically coupled to the processor and the actuator,
   wherein the vehicle wash component includes the processor integrated into a single assembly, wherein the processor is configured to receive a 24 VAC, 24 VDC, or 120 VAC, ±20% signal from a customary car wash controller located at the vehicle wash location, the signal for commanding control of the vehicle wash component located at the vehicle wash location according to operating parameters of the customary car wash controller, and upon receipt of the signal, the processor interprets the signal, generates a separate signal for controlling the operational status of the vehicle wash component according to operating parameters of the vehicle wash component that are different from the operating parameters of the customary car wash controller, and transmits the generated signal to the actuator such that the vehicle wash component is operated using the operating parameters of the vehicle wash component,
   wherein the actuator receives the signal from the processor, and
   wherein the power source provides power to the actuator for operating the vehicle wash component based on the generated signal for the control of fluid delivery.

2. The plurality of vehicle wash components of claim 1, wherein the power source is independent of any power source of the car wash controller.

3. The plurality of vehicle wash components of claim 1, wherein at least one of the vehicle wash components comprises a fluid delivery nozzle and the actuator comprises a solenoid valve operatively coupled to the fluid delivery nozzle.

4. The plurality of vehicle wash components of claim 1, wherein at least one of the vehicle wash components comprises a plurality of fluid delivery nozzles and the actuator comprises a plurality of solenoid valves each operatively coupled to a respective one of the plurality of fluid delivery nozzles, and wherein the power source is independent of any power source of the car wash controller.

5. The plurality of vehicle wash components of claim 1, wherein the signal received from the car wash controller is sensed by the processor as a sensed voltage, and the processor instructs the actuator to be powered at a voltage independent of the sensed voltage.

6. The plurality of vehicle wash components of claim 1, wherein the processor is coupled to a computer network.

7. The plurality of vehicle wash components of claim 6, further comprising a vehicle wash communications gateway in a location proximate the vehicle wash component at the vehicle wash location and configured to communicatively couple the processor to the computer network.

8. The plurality of vehicle wash components of claim 7, wherein the vehicle wash communications gateway is communicatively coupled to the plurality of the vehicle wash components at the vehicle wash location.

9. The plurality of vehicle wash components of claim 7, wherein the communicative coupling of the vehicle wash communications gateway to the plurality of the vehicle wash components is by a serial connection via successive vehicle wash components.

10. The plurality of vehicle wash components of claim 1, wherein at least one of the vehicle wash components comprises a pump operated by the processor.

11. A car wash computer network, comprising:
a plurality of communications gateways, each of the communications gateways located at separate vehicle wash locations; and
a plurality of vehicle wash components communicatively coupled to each communications gateway, each of the vehicle wash components comprising:
an onboard processor;
an actuator configured to control an operational status of the vehicle wash component; and
a power source electrically coupled to the processor and the actuator, wherein the vehicle wash component includes the processor integrated into a single assembly, wherein the processor is configured to receive a 24 VAC, 24 VDC, or 120 VAC, ±20% signal from a customary car wash controller located at the vehicle wash location, the signal for commanding control of the vehicle wash component according to operating parameters of the customary car wash controller, and upon receipt of the signal, the processor interprets the signal, generates a separate signal for controlling the operational status of the vehicle wash component according to operating parameters of the vehicle wash component that are different from the operating parameters of the customary car wash controller, and sends the generated signal to operate the actuator such that the vehicle wash component is operated using the operating parameters of the vehicle wash component,
wherein the actuator receives the signal from the processor to control the operational status of the vehicle wash component based thereon, and
wherein the power source provides power to the vehicle wash component based on the operational status of the vehicle wash component.

12. The car wash computer network of claim 11, wherein each of the communications gateways monitors the operational status of its respective vehicle wash component and provides monitoring data to the network.

13. The car wash computer network of claim 11, wherein the communications gateway is configured to send a signal to the processor for commanding control of the vehicle wash component, and upon receipt of the signal, the processor interprets the signal, generates a separate signal, and sends the generated signal to operate the actuator.

14. The car wash computer network of claim 11, wherein the actuator does not receive signals directly from the car wash controller.

15. The car wash computer network of claim 14, wherein the signal sent by the car wash controller is sensed by the processor as a sensed voltage, and the processor instructs the vehicle wash component to be powered at a voltage independent of the sensed voltage.

16. The car wash computer network of claim 14, wherein the power source is independent of any power source of the car wash controller.

17. A car wash computer network communicatively coupled to separate vehicle wash locations, comprising:
a plurality of communications gateways, each of the communications gateways located at a differing one of the separate vehicle wash locations; and
a plurality of vehicle wash components communicatively coupled to a communications gateway of the plurality of the communications gateways and located at a respective separate vehicle wash location, each vehicle wash component comprising:
a processor;
an actuator configured to control an operational status of the vehicle wash component,
wherein the vehicle wash component includes the processor integrated into a single assembly, the processor configured to receive signals from the communications gateway and from a car wash controller located at the respective separate vehicle wash location where the vehicle wash component is located, the signals from the customary car wash controller being 24 VAC, 24 VDC, or 120 VAC, ±20% signals, wherein the signals are for commanding control of the vehicle wash component at the respective vehicle wash location according to at least a first set of operating parameters, and upon receipt of the signals, the processor interprets the signals, generates a separate signal for controlling the operational status of the vehicle wash component according to a second set of operating parameters that are different from the at least first set of operating parameters, and sends the generated signal to operate the actuator such that the vehicle wash component is operated using the second set of operating parameters,
wherein the actuator receives the generated signal from the processor to control the operational status of the vehicle wash component based thereon.

18. The car wash computer network of claim 17, wherein the actuator does not receive signals directly from the car wash controller.

19. The car wash computer network of claim 18, wherein the signals sent by the car wash controller are sensed by the processor as sensed voltages, and the processor instructs the vehicle wash component to be powered at a voltage independent of the sensed voltages.

20. The car wash computer network of claim 17, the vehicle wash component further comprising a power source that is independent of any power source of a car wash controller located at the vehicle wash location.

* * * * *